United States Patent
Lee

(10) Patent No.: US 6,519,681 B2
(45) Date of Patent: Feb. 11, 2003

(54) CACHE MANAGEMENT METHOD OF USER TERMINAL CONNECTED TO NETWORK

(75) Inventor: Cheong-hoon Lee, Suwon (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/859,313

(22) Filed: May 14, 2001

(65) Prior Publication Data

US 2001/0021962 A1 Sep. 13, 2001

Related U.S. Application Data

(63) Continuation of application No. 09/037,686, filed on Mar. 10, 1998.

(30) Foreign Application Priority Data

Jul. 15, 1997 (KR) ............................................. 97-32923

(51) Int. Cl.[7] ............................................. G06F 12/02
(52) U.S. Cl. ........................ 711/118; 711/133; 711/135; 709/216
(58) Field of Search ................................ 711/118, 133, 711/135, 154, 159; 709/213, 216

(56) References Cited

U.S. PATENT DOCUMENTS 5,873,100 A * 2/1999 Adams et al. ............... 707/204
6,167,438 A * 12/2000 Yates et al. .................. 709/216

OTHER PUBLICATIONS

Microsoft Press Computer Dictionary, (c) 1994, p. 167.*

Ortega et al., "Soft Caching: Web Cache Management Techniques for Images", ©1997 IEEE, p. 475–480.*

* cited by examiner

Primary Examiner—Matthew Kim
Assistant Examiner—Brian R. Peugh
(74) Attorney, Agent, or Firm—Burns Doane Swecker Mathis, LLP

(57) ABSTRACT

A method of managing a cache which stores cache pages which are each a portion of display data which represents a web page downloaded from a network, is provided. The method includes the steps of: requesting an item of information through the user terminal by the user; downloading through the network from an external source the item of information requested by the user; and storing in the cache only a first cache page among cache pages which together represent the downloaded item of information. According to this method, the cache stores only the first cache page of the display data which represents each web page, i.e. the cache pages which represent the information which is most likely to be viewed again.

3 Claims, 3 Drawing Sheets

CACHE MANAGEMENT METHOD OF USER TERMINAL CONNECTED TO NETWORK

This application is a continuation of Ser. No. 09/037,686 filed Mar. 10, 1998.

BACKGROUND OF THE INVENTION

The present invention relates to a method for managing a cache of a user terminal connected to a network, and more particularly, to a method for managing a cache of a user terminal connected to a network, wherein information is rapidly displayed on a screen by storing more useful data in the cache.

In general, when a user uses a web browser to download a web page from a network such as the Internet to a user terminal, downloaded data is stored in a cache. The cache is a predetermined portion of the memory of the user terminal. Thus, when the web page later needs to be displayed again, it can be rapidly provided from the cache without having to be re-downloaded from the network.

FIG. 1A is an example of data downloaded from a network by a user, after the data has been processed in order to be displayed on the screen of the user terminal. In this example, the user downloads data of a 'sports' web page, which is processed to obtain sports display data 110 composed of cache pages A1, A2 and A3. Then, the sports display data 110 is used to display the 'sports' web page on the screen. Next, the user downloads data of a 'rugby' web page, via a hyperlink in the 'sports' web page. This data is processed to obtain rugby display data 120, which is composed of cache pages B1 and B2 and is used to display the 'rugby' web page on the screen. In the same way, the user then downloads and displays a 'NZ All Blacks' web page represented by all blacks display data 130 composed of cache pages C1, C2 and C3.

Here, cache pages A1, A2, A3, B1, B2, C1, C2 and C3 each represent a portion of a web page. The portions are approximately the same size as the screen.

FIG. 1B is a block diagram of a conventionally managed cache after downloading the data shown in FIG. 1A. The cache 140 stores every cache page of the display data of the downloaded web pages, that is, all of cache pages A1, A2, A3, B1, B2, C1, C2 and C3 shown in FIG. 1A.

FIG. 1C is a block diagram of another example of a conventionally managed cache after downloading the data shown in FIG. 1A. In FIG. 1C, the capacity of the cache 150 is small compared to the amount of downloaded data, thus only the most recent cache pages can be stored. Therefore the cache 150 can store only cache pages B2, C1, C2 and C3, and not A1, A2, A3 and B1.

In the case of FIG. 1C, if the user wants to display the 'sports' web page again, the user terminal must contact the network and download the required data again, since the cache pages A1, A2 and A3 have disappeared from the cache. Thus, the cache is not always effective in providing faster redisplay. A high percentage of the data stored in the cache is never used. This is because the most useful content of a web page is often at the top of the web page, with less useful content such as advertisements appearing below. Thus, a user often views only the first screen-sized area of the web page, i.e. the portion represented by cache pages A1, B1 or C1. However, all cache pages are stored in the cache. Accordingly, unnecessary data is retained in the cache, wasting the capacity of the cache and lowering the speed for accessing the cache. Thus, the average displaying speed is decreased.

SUMMARY OF THE INVENTION

To solve the above problems, it is an object of the present invention to provide a cache management method whereby more useful information can be stored in a cache by storing in the cache only the first cache page of the display data of a web page, thereby increasing cache hit rate and thus rapidly displaying information.

To accomplish the above object, there is provided a method of managing a cache implemented in a user terminal, when a user downloads information from a network to the user terminal, the method comprising the steps of: requesting an item of information through the user terminal by the user; downloading through the network from an external source the item of information requested by the user; and storing in the cache only a first cache page among cache pages which together represent the downloaded item of information.

It is preferable that information is stored in the cache using a FIFO method.

To accomplish another object, there is provided an information downloading method using a cache implemented in a user terminal, comprising the steps of: (a) detecting whether the cache contains a first cache page, among cache pages which together represent an item of information requested by a user; (b) displaying only the information represented by the first cache page, if in step (a) it was detected that the first cache page is stored in the cache; (c) downloading the requested page of information from an external source, if after performing step (b) it is necessary to display more of the requested page of information than the portion represented by the first cache page; and (d) downloading the requested item of information from an external source, and storing in the cache only the first cache page among cache pages which together represent the downloaded item of information, if in step (a) it was detected that the first cache page was not stored in the cache.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

Figure 1A:
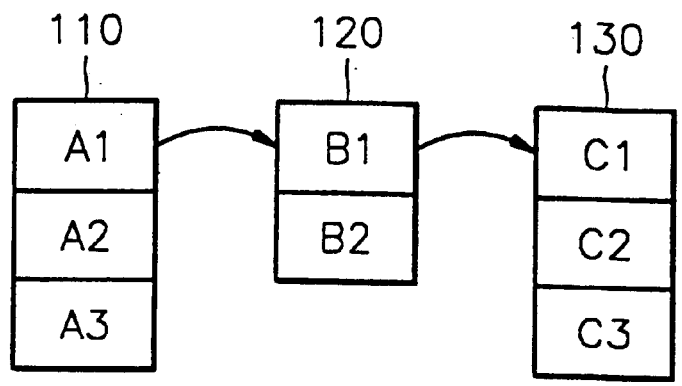
FIG. 1A is an example of data downloaded from a network by a user, after the data has been processed in order to be displayed on the screen of a user terminal.
Figure 1B:
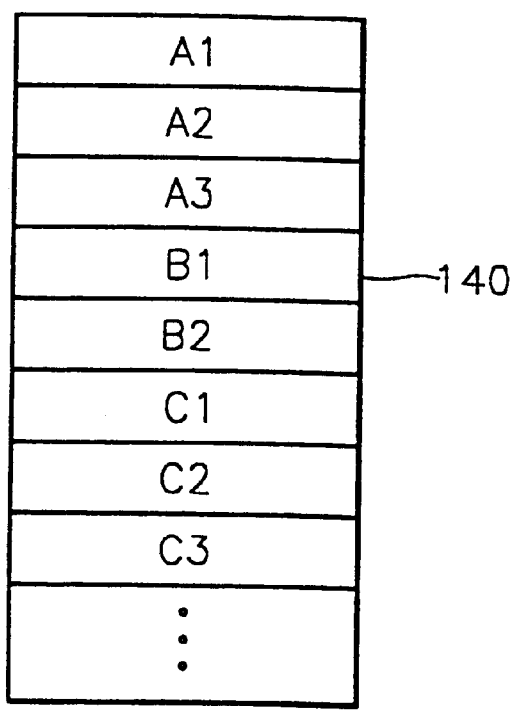
FIG. 1B is a block diagram of a conventionally managed cache after downloading the data shown in FIG. 1A.
Figure 1C:
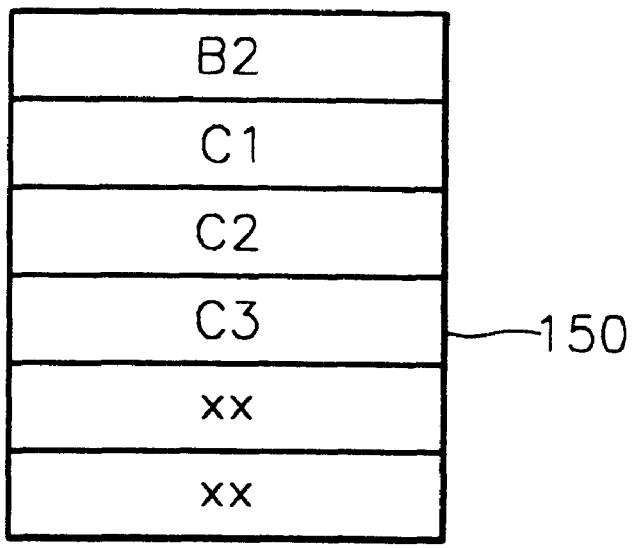
FIG. 1C is a block diagram showing another conventionally managed cache after downloading the data shown in FIG. 1A.
Figure 2:
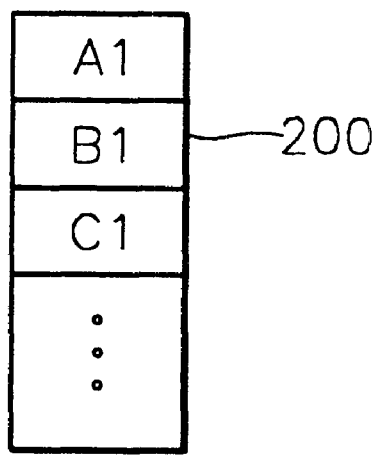
FIG. 2 is a block diagram showing a cache managed according to the present invention, after downloading the data shown in FIG. 1A.

Referring to FIG. 1A, a user downloads the web pages described above, represented by cache pages A1, A2, A3, B1, B2, C1, C2, and C3. As shown in FIG. 2, the cache 200 stores only cache pages A1, B1 and C1 corresponding to the first screen-sized area of each web page. That is because the first screen-sized area of each web page has more useful information than that in any other areas. If the cache stores only the first cache page of each web page in this way, it can store more various kinds of information, which when required again can be obtained without using the network. Thus, a user can view desired information rapidly.

Figure 3:
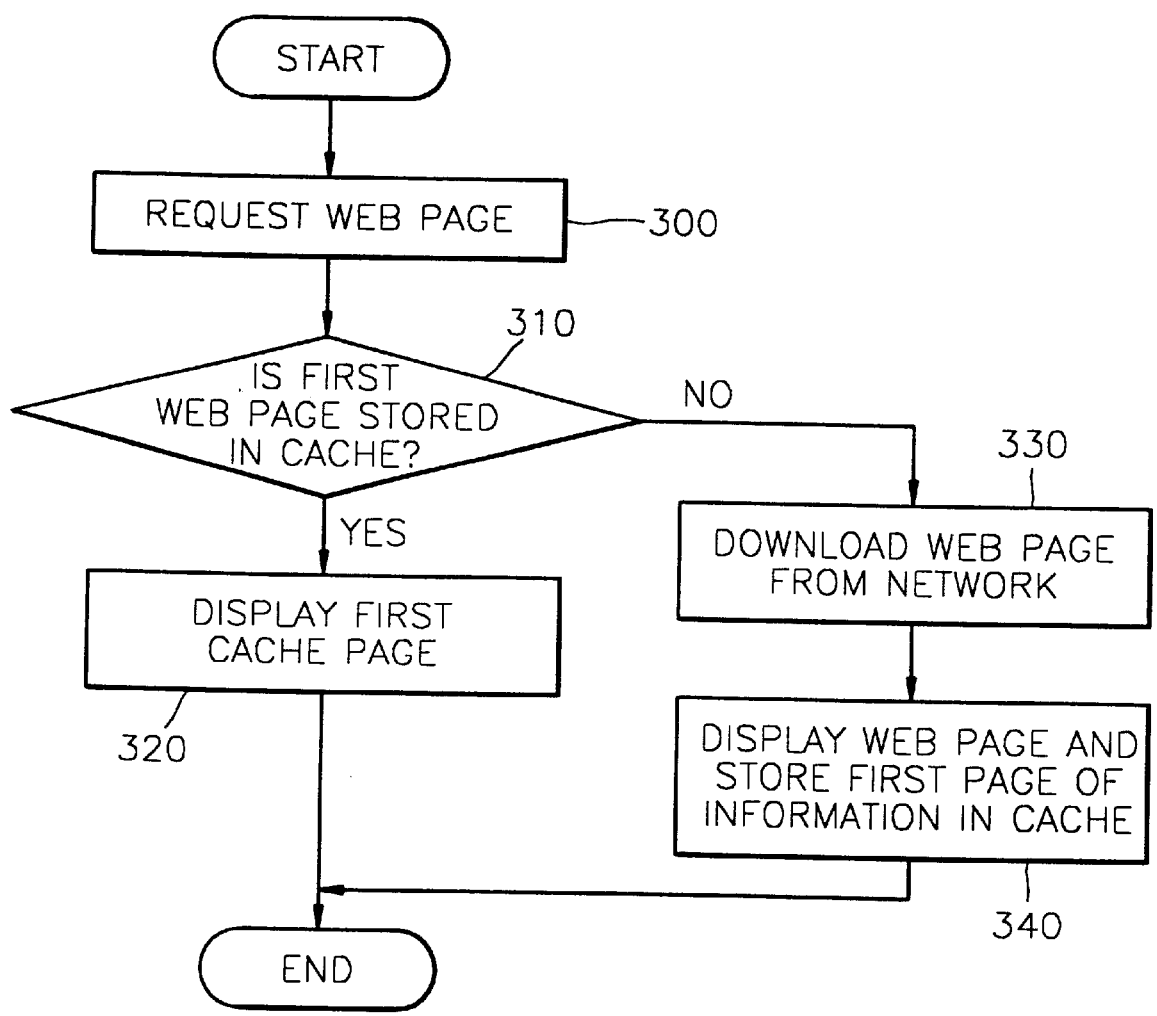
FIG. 3 is a flowchart outlining the cache management method according to the present invention.

FIG. 3 is a flowchart outlining the cache management method according to the present invention. First, a user requests a web browser to download a web page (e.g. the 'sports' web page) from a network to a user terminal, in step 300. Before contacting the network, the web browser initially detects whether the first cache page A1 of the display data 110 representing the requested web page is stored in a cache included in the user terminal, in step 310. If the cache contains the first cache page A1, the corresponding portion of the requested web page is displayed on the screen, in step 320. On the other hand, if the cache does not contain the first cache page A1, the requested web page is downloaded from the network, step 330. When the web page has been downloaded from the network, it is displayed on the user terminal screen, and the first cache page A1 of the display information 110 of the downloaded web page is stored in the cache, in step 340. At this time, if the cache has no free space, old information is discarded from the cache according to a FIFO method. After step 320, to view portions of the web page other than the portion corresponding to first cache page, the web page must be downloaded from the network again as in step 330. The above steps are repeated each time a user requests a web page the web browser.

According to the present invention, the cache stores only the first cache page of the display data representing each web page, which represents the portion of each web page most likely to be viewed again, so that more useful information can be stored in the cache. Therefore, cache hit rate can be increased, thus redisplaying the web pages faster.

What is claimed is:

1. A method of managing a cache implemented in a user terminal, when a user downloads information from a network to the user terminal, said method comprising the steps of:

requesting an item of information through the user terminal by the user;

downloading through the network from an external source the item of information requested by the user; and storing, without human intervention, in the cache only a first page among cache pages which together represent the downloaded item of information.

2. The method of managing a cache of claim 1, wherein the cache is a FIFO cache.

3. An information downloading method using a cache implemented in a user terminal, comprising the steps of:

(a) before downloading some information from a network server, detecting whether the cache contains a first cache page, among cache pages which together represent the information requested by a user;

(b) displaying only the contents in the first cache page, if in step (a) it was detected that the first cache page is stored in the cache;

(c) downloading more of the contents from the network server, if after performing step (b) the rest of contents of the information is requested to be displayed; and (d) downloading the information from the network server, and storing without human intervention only a first cache page among cache pages which together represent the downloaded item of information, if in step (a) it was detected that the first cache page of the information was not stored in the cache.

* * * * *